(12) United States Patent
El Kharzazi (10) Patent No.: US 12,147,562 B1
(45) Date of Patent: Nov. 19, 2024

(54) ARTIFICIAL INTELLIGENCE-ENHANCED LEDGER COMPUTING ENVIRONMENT SYSTEM FOR RECORDING THE OUTCOMES OF COLLECTIVE EFFORT

(71) Applicant: Romella Janene El Kharzazi, Tempe, AZ (US)

(72) Inventor: Romella Janene El Kharzazi, Tempe, AZ (US)

( * ) Notice: Subject to any disclaimer, the term of this patent is extended or adjusted under 35 U.S.C. 154(b) by 896 days.

(21) Appl. No.: 17/206,120

(22) Filed: Mar. 19, 2021

Related U.S. Application Data (63) Continuation-in-part of application No. 15/836,864, filed on Dec. 9, 2017, now abandoned.

(51) Int. Cl.
| | |
|---|---|
| *H04L 29/06* | (2006.01) |
| *G06F 16/248* | (2019.01) |
| *G06F 21/62* | (2013.01) |
| *G06N 3/008* | (2023.01) |
| *G06N 5/04* | (2023.01) |

(Continued)

(52) U.S. Cl.
CPC ........ *G06F 21/6245* (2013.01); *G06F 16/248* (2019.01); *G06N 3/008* (2013.01); *G06N 5/04* (2013.01); *G06N 20/00* (2019.01); *H04L 63/0428* (2013.01); *H04L 63/06* (2013.01)

(58) Field of Classification Search
CPC .... G06F 21/6245; G06F 16/248; G06F 21/62; G06F 21/6209; G06F 21/6218; G06F 21/6227; G06F 21/64; G06F 16/1824; G06F 21/44; G06F 21/629; G06F 16/2379; G06F 16/9027; G06N 20/00; G06N 3/008; G06N 5/04; H04L 63/0428; H04L 63/06; H04L 9/0643; H04L 9/30; H04L 2209/38; H04L 9/0637; H04L 9/0618; H04L 9/3247; H04L 9/3239; H04L 9/3263; H04L 2209/56; H04L 9/0656; G06Q 20/06; G06Q 20/382; G06Q 20/401; G06Q 2220/00; G06Q 20/381; G06Q 40/04; G06Q 20/3825; G06Q 20/3827; G06K 9/00577; G06K 2009/00583

See application file for complete search history.

(56) References Cited

U.S. PATENT DOCUMENTS

| | | | |
|---|---|---|---|
| 11,184,157 B1 * | 11/2021 | Gueron | H04L 9/14 |
| 11,861,619 B1 * | 1/2024 | Vijayaraghavan | G06Q 20/389 |
| 2018/0183580 A1 * | 6/2018 | Scarlata | G06F 21/53 |

(Continued)

*Primary Examiner* — Malcolm Cribbs (57) ABSTRACT

A method based on converging a platform-neutral, self-sovereign ledger technology and artificial intelligence in a virtual machine environment concerning the collective efforts and outcomes of an entity (e.g., person, team, or organization) or group of entities in both quantum and non-quantum computing environments. This method results in an artificially intelligent ledger with dual-layer floating encryption and available steganographic integration, which contains representations of things of value (past, current, and future outcomes, including data and other information) concerning entities (e.g., individuals, groups of people, or organizations) engaged in collective effort (e.g., trade, finance, work, or activism). Furthermore, this method produces a means of validating, auditing, and analyzing data and other information and automatically communicating that data and other information to stakeholders.

2 Claims, 6 Drawing Sheets

(51) Int. Cl.
*G06N 20/00* (2019.01)
*H04L 9/40* (2022.01)

(56) References Cited

U.S. PATENT DOCUMENTS

2021/0357801 A1* 11/2021 Ji .......................... G06V 10/764
2022/0103520 A1* 3/2022 Chifor ................. H04L 63/0236

* cited by examiner

ARTIFICIAL INTELLIGENCE-ENHANCED LEDGER COMPUTING ENVIRONMENT SYSTEM FOR RECORDING THE OUTCOMES OF COLLECTIVE EFFORT

RELATED APPLICATIONS

This Application is a Continuation-In-Part application to U.S. patent application Ser. No. 15/836,864 filed Dec. 9, 2017, entitled "SYSTEM AND METHOD FOR APPLYING ARTIFICIAL INTELLIGENCE AND HIGHLY DISTRIBUTED STORAGE SYSTEMS TO HUMAN RESOURCES INFORMATION MANAGEMENT", which is incorporated herein by reference in its entirety, and claims any and all benefits to which it is entitled therefrom.

FIELD OF THE INVENTION

The present invention is related to electronic ledgers, and in particular, to an artificial intelligence-enhanced ledger computing environment system in which transaction data is posted to the ledger using both primary encryption and data encryption.

BACKGROUND OF THE INVENTION

Many current informational systems still rely on many manual inputs into these systems and for utilizing the data they store. This is especially true with respect to analytics and the subsequent decision-making processes. Some businesses still maintain paper records. Furthermore, from a records management perspective, there are many opportunities to have incorrect information input into the application without a clear record of who, why, and what were the activities the person who entered that information was attempting to complete. This presents major challenges to the integrity of the data captured and maintained in the cloud and to accountability. The ledger technology described herein will create an irrefutable log of an entity's efforts and outcomes, creating a durable data and transaction audit trail and complete user accountability and enhanced security.

While maintaining ledgers is a routine business activity, businesses are not mandated to use a computerized record-keeping method. This proposed method creates an inventive technology in a ledger computing environment (LCE) that is a novel application of artificial intelligence and entropic floating encryption technology that can simplify recordkeeping. Specifically, this technology creates an artificially intelligent (AI) computing-based encrypted ledger technology, where the computer self-learns or performs actions that mimic human cognitive functions through the use of mathematical algorithms, where the ledger contains representations of things of value concerning entities organized for collective effort, in both quantum and non-quantum encrypted computing environments, where the encryption is an entropic floating computerized privacy method for securing the ledger contents and is inherent to the ledger environment, with a separate encryption layer for the transactions, themselves.

This technology differs from blockchain, which is also known as High Distributed Storage Systems (HDSS), in that there is no requirement to use a computerized system which relies upon HDSS. Additionally, this technology differs from HDSS in that there is no need for external validators who conduct mining, which involves the use of massive computing power to solve extraordinarily complex mathematical problems as the key component of encryption to ensure the validity of transaction posted to the computerized ledger. This technology is self-sovereign. Because of this fact, this technology is more environmentally friendly, as it requires less electricity and storage space. Because there are no external validators required, this technology is inherently more secure, while being more scalable (i.e., the ledger can be as large or as small as the entity using it requires) or divisible (i.e., portions of the ledger can be archived off the active ledger, without losing the encryption). This ledger technology, unlike blockchain, requires users to have known-user credentials to access the ledger, which prevents, if not fully eliminates some concerns with most cryptocurrencies, such as illegal payments among anonymous bad actors. This technology also differs from blockchain and other existing ledger methods because there is dual encryption, where the transactions are encrypted, and the actual ledger environment is separately encrypted with both encryption layers using an entropic floating method. Moreover, the encryption used in this technology is recursive, which means that encryption is revalidated whenever the ledger is accessed because the encryption is tied to the overall computing environment with the transactions have separate encryption; this is not the case with blockchain. If the recursive encryption fails to revalidate the ledger, then the technology can automatically alert system administrators to the issue. Finally, this ledger computing environment will operate in both quantum and non-quantum computing environments.

The publication by Batishchev (2019/10,296764) describes a method that results in a cryptographically secured ledger, which is blockchain. The method described in the present patent application results in a smart ledger, which in not limited HDSS or requires third-party validators, as does Batishchev's method. The method herein is not blockchain or a blockchain derivative. The method herein also differs from Batishchev because it incorporates artificial intelligence; Batishchev does not incorporate artificial intelligence and provides no description of how AI could be integrated. Furthermore, this inventive technology incorporates the ability to predict future outcomes and describe trends past and present; Batishchev's method does not contain these capabilities. In Batishchev, auditing is described is the authentication and does not actually conduct auditing that occurs as a part of an organizational governance process; the present method includes governance features. Furthermore, this auditing may be performed inside of the inventive technology, either by manual checks or algorithmic feedback, or outside of the inventive technology, where result may or may not be input into the inventive technology.

The Hong et al. (2017/0192994) method has the same technical limitations of Batishchev's method previously detailed (e.g., no clearly integrated AI and is HDSS/blockchain-specific). While Hong et al. describe "emotional relationships" with the entries being assertions of gratitude, this method is focused on the transactions of exchanging these assertions of gratitude, which differs significantly from the method and claims herein. The method described herein is for creating an artificially intelligent computing-based ledger technology is focused on behaviors (i.e., actions and efforts) and their outcomes and not on emotions. The inventive purpose of this method is to create indelible records of outcomes.

The American Psychological Association (APA) defines behavior as, "an organism's activities in response to external or internal stimuli, including objectively observable activities, introspectively observable activities (see covert behavior), and nonconscious processes." (https://dictionary.apa.org/behavior). Conversely, APA defines emotion as, "a complex reaction pattern, involving experiential, behavioral, and physiological elements, by which an individual attempts to deal with a personally significant matter or event. The specific quality of the emotion (e.g., fear, shame) is determined by the specific significance of the event. For example, if the significance involves threat, fear is likely to be generated; if the significance involves disapproval from another, shame is likely to be generated. Emotion typically involves feeling but differs from feeling in having an overt or implicit engagement with the world." (https://dictionary.apa.org/emotion). While emotion and behavior can influence each other (e.g., you do something bad, then you feel bad or you are happy, so you laugh), they are clearly different phenomenon and are not operationalized, analyzed, managed, or treated in the same manner. This method is not focused on defining the value as a part of the operation of the ledger, but instead the valuation of any emotion objects that could be part of the ledger features are inputs. Finally, the Hong et al. method does not describe any reporting or auditing capabilities in sufficient detail to conclude that any extension of their method would impact the claims made herein.

This method is also different from that of Wiig et al. (2017/15731302). While Wiig et al. in corporate AI into their ledger technology, they specify blockchain; the present method uses unique inventive technology that is non-blockchain ledger technology. Furthermore, Wiig et al. focus on transforming the data in the technology, where the present method does not perform any transformations. A very important difference between the present method and the Wiig et al. method is that Wiig et al. include AI algorithms, such as game theory and Monte Carlo studies for performing market evaluations and optimal pricing. Finally, the function of auditing can occur inside or outside of the inventive technology. This critique of Wiig et al. applies to their similar preceding and follow-on applications (i.e., 2014/14544314, 2013/13815843, 2017/15732485, etc., whether or not identified, herein).

The Karumba method (2017/20180189449) describes what is generally recognized as blockchain and applies blockchain to the management of medical records and the delivery of medical services. As is the case with the Wiig, Hong, and Batishchev, the Karumba's reliance upon HDSS and blockchain (i.e., stringing one block on to the next block, while preserving the previous node) makes the claims in Karumba completely moot with respect to the inventive technology described in the present method; again, the current inventive technology is not blockchain and does not rely upon a scheme of HDSS. None of the aforementioned works of prior art include any semblance of self-sovereignty. This current inventive technology integrally incorporates dual-layer entropic floating encryption, AI, and works in both quantum and non-quantum environments. None of the methods of previous inventors, whether or not identified, herein, encapsulate any portion of the method of this inventive technology.

SUMMARY OF INVENTION AND ADVANTAGES

The method described herein creates a self-sovereign artificially intelligent computing-based ledger dual-layer entropic floating encryption technology of representations of things of value concerning a person (or other entity) or groups of people (or other entities) organized for collective effort (e.g., work), action, or social justice. One possible means of operationalizing this method is through the use of non-quantum computing environments. However, other computing environments, including environments, are conceivable. Another possible means of operationalizing this method is through the integration of entropic floating encryption. However, in a quantum environment, is possible that the entropic floating encryption could be viewed as being unnecessary due to the lack of sensitivity of information contained in a given ledger. Additionally, the encryption, instead of random hash generation could use meaningful bits of information from the transactions, themselves to build the hash.

Any ledger created from this method would be made "smart" through the integration of artificial intelligence. Artificial intelligence is operationalized by the public domain understanding of the use of mathematical algorithms/equations to help computers in "learning" and making "decisions" from the analysis and interpretation of data and other information. This proposed method documents a novel application of artificial intelligence, including in the manner of encryption, and ledger technology that enables recordkeeping activities to yield valuable data and other information on things of value concerning a person (or other entity) or groups of people (or other entities) organized for collective effort or action and/or social justice for decision-makers, regulators, and/or auditors.

An accounting ledger is an account or record used to store bookkeepng entries for balance-sheet and income-statement transactions. Accounting ledger journal entries can include accounts like cash, accounts receivable, investments, inventory, accounts payable, accrued expenses, and customer deposits to name a few. Types of ledgers can also include sales, purchase and general eldgers.

A hash is a function that converts one value to another. Hashing data is a common practice in computer science and is used for several different purposes. Examples include cryptography, compression, checksum generation, and data indexing. Hashes are the output of a hashing algorithm like MD5 (Message Digest 5) or SHA (Secure Hash Algorithm). These algorithms essentially aim to produce a unique, fixed-length string—the hash value, or "message digest"—for any given piece of data or "message". As every file on a computer is, ultimately, just data that can be represented in binary form, a hashing algorithm can take that data and run a complex calculation on it and output a fixed-length string as the result of the calculation. The result is the file's hash value or message digest.

Benefits and features of the invention are made more apparent with the following detailed description of presently preferred embodiments thereof in connection with the accompanying drawings, wherein like reference numerals are applied to like elements.

For a better understanding of the invention reference is made to the following detailed description of the preferred embodiments thereof which should be taken in conjunction with the prior described drawings.

DETAILED DESCRIPTION OF THE INVENTION

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

Figure 1A:
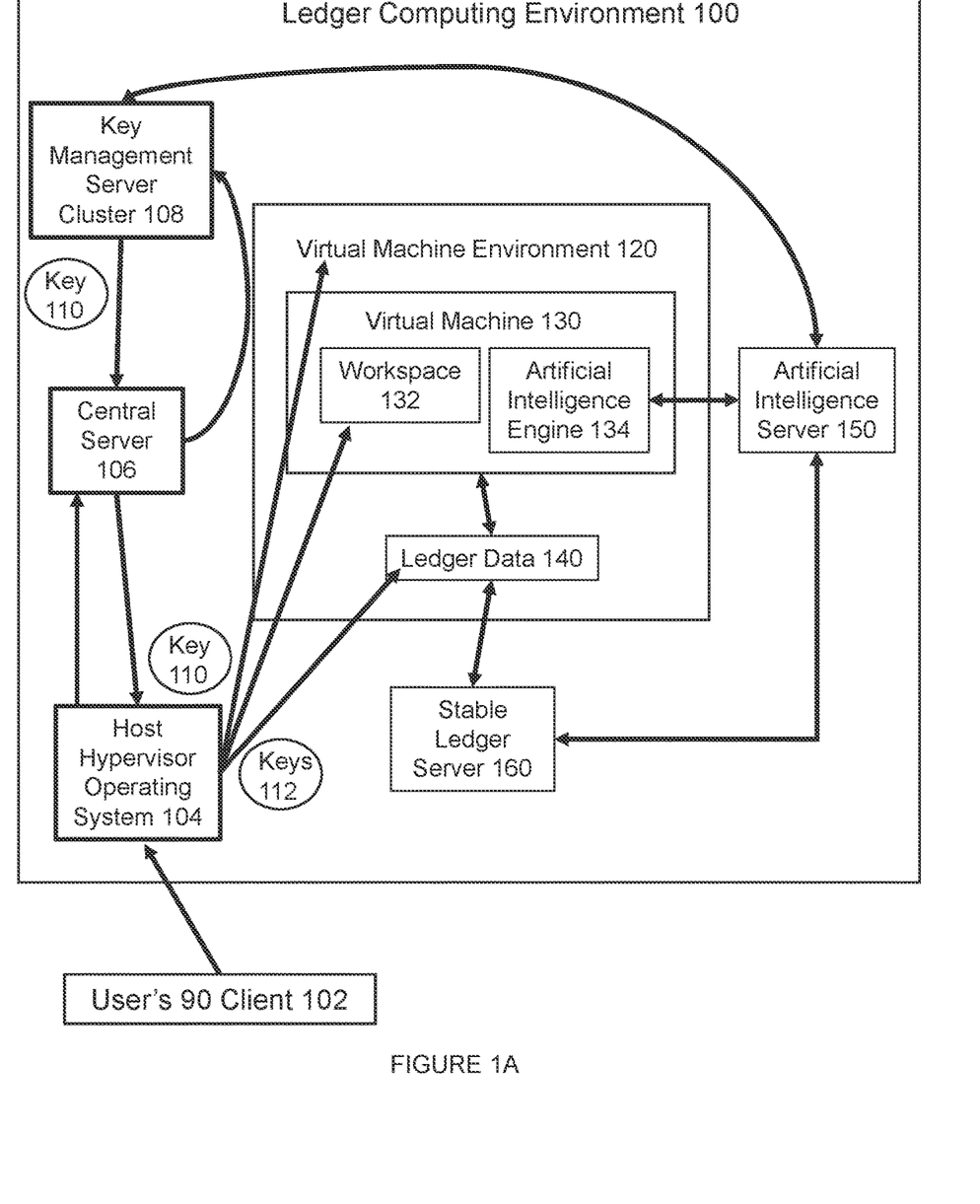
FIG. 1A is an example configuration of an embodiment of the Ledger Computing Environment 100 of the present invention as described herein.

FIG. 1A is an example configuration of an embodiment of the Ledger Computing Environment 100 of the present invention as described herein. The following is a list of the method components of the Ledger Computing Environment 100.

Ledger Computing Environment (LCE) 100 is the entire inventive technology described herein; within it, the User 90 posts transactions to a secure, validated, ledger and can view the ledger and get automated reports on ledger data.

Client 102 is the User 90's computer through which the User 90 connects to the Host; the Virtual Machine Environment may a partition of the client or might exist on a server that is remote from the client. The client's inputs are used by User 90 to enter transaction details in the Virtual Machine.

Host Hypervisor Operating System (Host) 104 is the server through which the User 90's client connects to launch the Ledger Computing Environment 100. The Host notifies the Central Server of the request to connect from the client. The Host receives the Primary Encryption Key and from the Central Server. The Host also creates the Data Encryption Keys and passes them along to the Virtual Machine Environment. The Host 104 can allow multiple Users 90 to access the Ledger Computing Environment (LCE) 100 simultaneously, with the limit on the number of users dependent upon the number of computer servers supporting the LCE.

Central Server (CS) 106 is the intermediary between the Host and the Key Management Server. It might be comprised of a single server or a cluster of servers, depending upon the scale of the implementation of the Ledger Computing Environment 100 required by the Users 90s. The CS requests the Primary Encryption Key from the Key Management Server after receiving a prompt from the Host that a new connection has been requested. It receives the Primary Encryption Key from the Key Management Server and passes it along to the Host, while stores the Key ID.

Key Management Server (KMS) 108 is the device which creates the Primary Encryption Key and the unique key identifier (Key ID) with the assistance of the Artificial Intelligence Server. It shares the Primary Encryption Key and the Key ID with the Central Server.

Primary Encryption Key (PEK) 110 is the algorithmic security feature that ensure the ledger's contents are complete and accurate. It is created by the Key Management Server and the Artificial Intelligence Server.

Data Encryption Keys (DEK) 112 are the algorithmic security features which ensures that the Virtual Machine Environment is secure and protects the contents of the ledger.

Virtual Machine Environment 120 contains the Virtual Machine and the Ledger Data.

Virtual Machine (VM) 130 contains the Workspace and the Artificial Intelligence Engine.

Workspace 132 is an area within the Virtual Machine where the User 90 interacts with the ledger. The User 90, through the inputs of their client, enters and submits transaction data for posting to the ledger. The User 90 can also request to view the ledger and to run reports on the ledger's contents.

Artificial Intelligence Engine 134 is an area within the Virtual Machine which acts as a shell to send commands to the Artificial Intelligence Server (AIS) to run algorithmic processes. The AIE works in tandem with the AIS to create the encryption and Hash for the transactions. After the AIE has completed the encryption and Hash, the transaction then posts to the ledger.

Ledger Data 140 is the details of the transaction, the actual ledger, itself, and the ledger's metadata.

Artificial Intelligence Server 150 is the computing space for algorithms used by the ledger technology, which includes for Primary Encryption Key creation, transaction encryption and hashing, ledger data analysis, and steganography.

Stable Ledger Server 160 houses the permanent copy of the ledger, the ledger's metadata, and the ledger access logs.

Method Description

The proposed method utilizes an encrypted, self-sovereign Ledger Computing Environment (LCE) 100, serving as a virtual machine (VM) 130, which houses the active ledger. This is the first layer of encryption of this inventive technology. Virtual machine encryption (VME) 120 involves a device to serve as the Key Management Server (KMS) 108, another device to act as the Central Server (CS) 106, and a third device to act as the Host Hypervisor Operating System (Host) 104. The Central Server requests a Primary Encryption Key (PEK) 110 from the Key Management Server (KMS) 108, which provides the key and a key ID. The Central Server (CS) 106 stores the key ID 110, but not the key itself and passes the key and the key ID to the Host 104. The Host 104 only keeps the key 110 in active memory and does not store it permanently. If the Host 104 is rebooted of the VM 130 is logged off and the Workspace closes 132, the Host no longer has the PEK 110. The VM 130 logs into the Host 104, which alerts the CS 106 to request the encryption key. The Host 104 creates data encryption keys (DEK) 112 to encrypt the VM 130 the data 140 generated by the VM. Also, the Host passes along the PEK 110 to encrypt the VME 120. This method encrypts the DEKs with the PEK. The result is a secure communication channel for completing ledger transactions. The VME 120 continuously passes transactions to the Stable Ledger Server (SLS) 160, which no User 90 directly accesses and contains the master copy of the ledger, the ledger access logs, and the ledger's metadata. A data connection to the SLS is established when the VM 130 is launched. The AI Server (AIS) 150 provides the computing space for the AI algorithms to run, while the VM 130 uses a shell, the Artificial Intelligence Engine (AIE) 134 to send commands to the AIS 150. The AIS 150 also assists the KMS 108 in the creation of the PEK 110. The LCE 100 houses the KMS 108, CS 106, Host 104, VME 120, AIS 150, and the SLS 160. The VME 120 houses the VM 130 and Ledger Data (LD) 140, which is the ledger and the metadata from VM 130 session. The VM contains the computing Workspace 132, where transactions are entered by Users 90, and the AIE 134, which securely connects to the AIS 150. Initiating a connection to the VM 130, through the Host 104, launches the LCE 100. (See FIG. 1A, 1B)

The method of creation of an encrypted virtual environment to provide dual-layer encryption to ledger technology in this manner is a novel, non-obvious application. The VME 120 may be on a cloud-based server and not reside on the User 90's client; the method described herein is unaffected by the location of the VME.

Moreover, an SLS and AIE are not standard features in a VME; traditionally, the data must be manually saved to the individual User 90's computer before closing the VM session and that User 90's data is not available to other users of the VME. The integration of a data connection between the VM 130 and SLS 160 is a unique aspect of this inventive technology.

Users 90 request a connection to the Host 104 via logging into the Host with unique User 90 IDs and User 90 created passwords. In general, in computing, it is standard practice to require a User 90 ID and password to log on to a virtual machine. Self-sovereign, in this inventive technology, means "enclosed" and "self-validating"; it does not relate to its usage in Blockchain or distributed ledger technologies. Moreover, self-sovereign in this inventive technology does not rely upon a token or chip and Is not an inherent digital identity, instead Users 90's identity is "known" through the registration of the User 90, where the User 90 is authorized to be able to request a connection to the Host 104 with their individual client, which may be any computing device.

This inventive ledger technology is operable in both quantum and nonquantum encrypted computing environments and is platform-neutral, including mobile. In the current universal standard computing environment, which is non-quantum, the VME uses 256-bit encryption. In the quantum environment, the LCE 100 uses bits of electric charges (positively or negatively charged particles or sub particles) which can infinitely exceed 256 bits. Neither current encryption standards nor future quantum-based encryption is claimed as novel; however, their configuration and application in this inventive technology is novel and is non-obvious.

Recursive validation occurs when the ledger, through the launching of the VM 130, is revalidated as the most recent archived copy of the ledger is automatically compared to the current copy in SLS 160, as it is passed to the VM 160. When the ledger is recalled to the VM 160, it is decrypted and the Hash 114 is revalidated in the AIE 134. Archiving is automatic and continuous within the SLS. If this recursive validation fails, then the VME will automatically alert system administrators via email and messaging systems, which Users 90 specify during the configuration of the VME.

The number and capacity of the components of the LCE 100 are scalable, depending upon the end-User 90's needs.

Figure 1B:
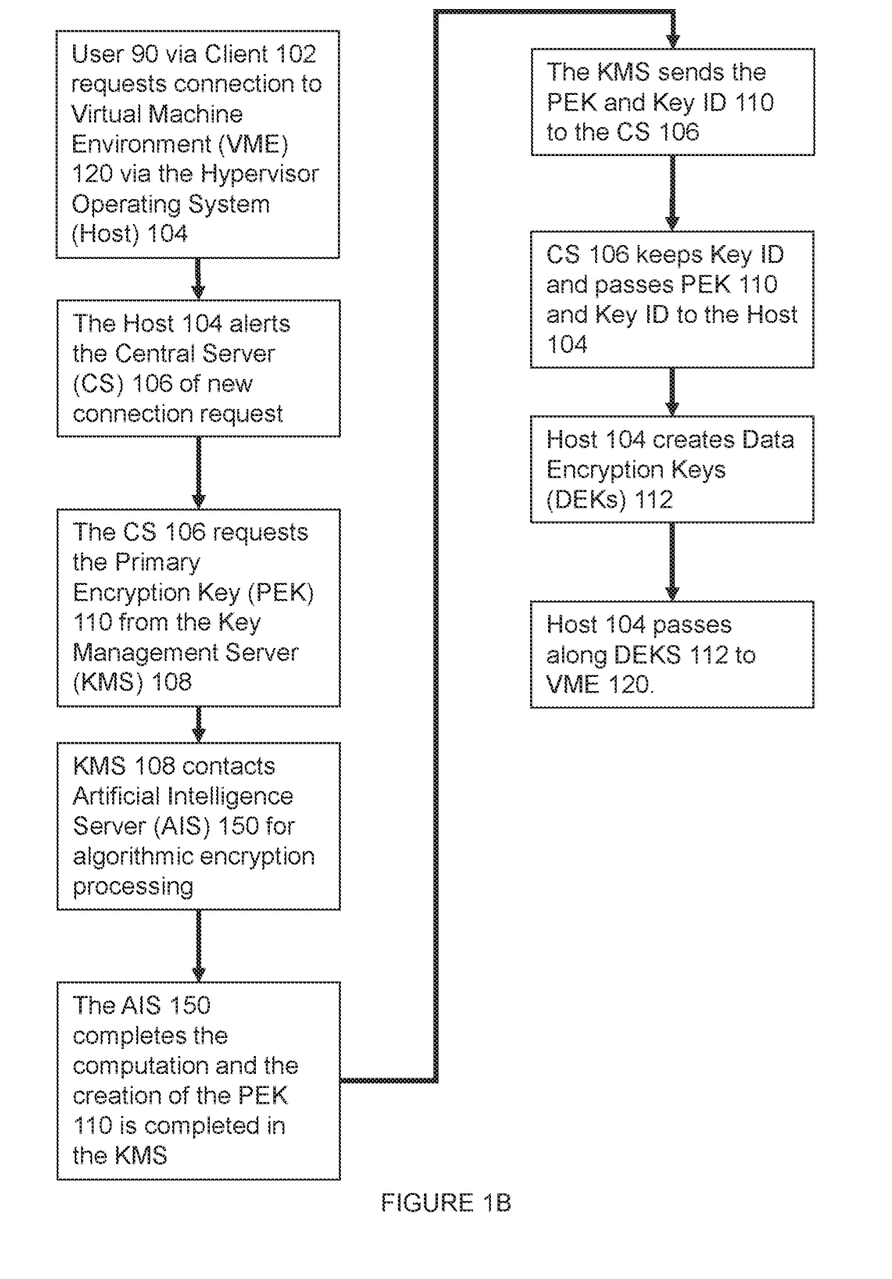
FIG. 1B is an example configuration of the steps of a method of use of an embodiment of the Ledger Computing Environment 100 of the present invention as described herein.

FIG. 1B is an example configuration of the steps of a method of use of an embodiment of the Ledger Computing Environment 100 of the present invention as described herein.

In a first step, a client 102 requests connection to virtual machine environment 120 via the hypervisor operating system host 104;

In a second step, the host 104 alerts the central server 106 of new connection request;

In a third step, the central server 106 requests the primary encryption key 110 from the key management server 108;

In a fourth step, key management server 108 contacts artificial intelligence server 150 for algorithmic encryption processing In a fifth step, the artificial intelligence server 150 completes the computation and the creation of the primary encryption key 110 is completed in the key management server 108;

In a sixth step, the key management server sends the primary encryption key 110 and key ID to the central server 106;

In a seventh step, central server 106 keeps key ID and passes primary encryption key 110 and key ID to the host 104;

In an eighth step, host 104 creates data encryption keys 112; and

In a ninth step, host 104 passes along data encryption keys 112 to virtual machine environment 120.

Figure 2A:
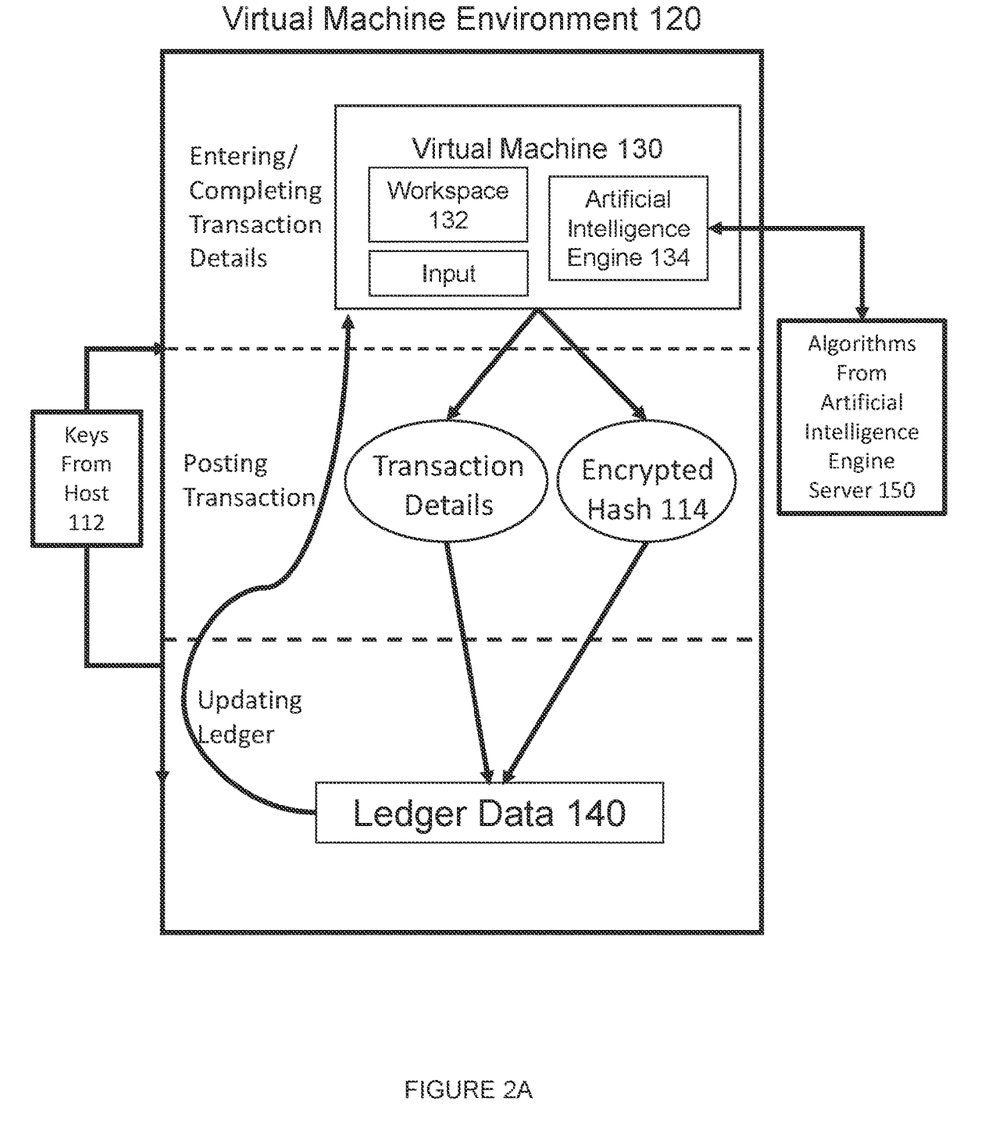
FIG. 2A is an example configuration which depicts the posting of a transaction to an embodiment of the Ledger Computing Environment 100 of the present invention as described herein.

FIG. 2A is an example configuration which depicts the posting of a transaction to an embodiment of the Ledger Computing Environment 100 of the present invention as described herein.

The proposed method is a novel application of entropic floating encryption, where entropic floating encryption dynamically creates random encryption keys to encrypt transactions using an artificial intelligence (AI) algorithmic key generator (i.e., both the AIE 134 and AIS 150) in combination with random content extracted from the transaction. In the case of a quantum environment, the encrypted Hash 114 will also include coded electric charges. This is the second layer of encryption in this novel inventive technology. The result is a unique encrypted Hash key 114 for each transaction when the transaction is posted to the ledger.

The "floating" encryption is an AI generated encryption, specifically machine learning, that uses mathematical entropy to losslessly (i.e., efficiently and accurately) and securely transmit information via a secure communication channel (i.e., in the VME 120) to the DEK encrypted ledger 140.

Transactions may be financial or merely informational, where the transactions include both structured and unstructured data (i.e., numbers, figures, photographs, images, documents, email, system logs, etc.). Transactions are completed in the Workspace 132. The value of the transactions may be of inherent value or may be derived outside of the method. The external valuations may be economic, psychological, social, political, or cultural in nature.

Artificial Intelligence is used in three ways within this inventive technology: 1) To encrypt the Ledger Computing Environment (LCE) 100; 2) to hash ledger transactions within the VME 120 using the AIE 134 with the support of the AIS 150; and 3) in the analysis of ledger data 140 for issuing alerts to system administrators and creating user 90 reporting. The entropic floating encryption is the AI process for encrypting the LCE and creating transaction hashes in the non-quantum environment. Also, entropic floating encryption is the AI process for encrypting the LCE in the quantum environment. In the specific case of hashing transactions, it may also be used in the quantum environment, if the data is particularly sensitive, such as contains privileged or classified information or personally identifiable information (e.g., social security numbers). In the quantum environment, if the data is not particularly sensitive, the AIS 150 can create a random partial hash by sending bits of pulses of positively or negatively charged currents from the AIS 150 to the AIE 134. In general, the AIS 150 uses an algorithm, such as a recurrent neural network algorithm, to create the partial hash. In the specific case of f analysis for threshold alerts (i.e., an alert for when a transaction posted to the ledger exceeds or fails to meet pre-established parameters; for example, a transaction has an abnormally high dollar value) or analytical reports, an algorithmic process (i.e., the use as the execution of an algorithm, such as linear regression) is completed by the AIE 134 with the assistance of the AIS 150. The proposed method is a novel application of advanced artificial intelligence (AI) to information management processes for recordkeeping purposes; specifically, in this inventive encrypted ledger technology, the technology self-learns or performs actions that mimic human cognitive functions using mathematical algorithms.

The separate AIE 134, with the assistance of the AIS 150, in the VME 120 routinely performs validation analyses to ensure the integrity of the ledger; the AI processes run program routines for historical and trend analyses of data and other information in the ledger to detect unpredicted or unexplained variances to flag potential problematic transactions or security issues with the ledger, itself. If an issue is found, the inventive technology automatically notifies system administrators. Also, if the recursive validation fails, the system administrators.

This AIE uses algorithms, including, but not limited to: Adversarial, classification, and network algorithms, with and without machine learning (ML), to detect variances during the auditing of the ledger. Variances can be pre-defined by Users 90 and/or be emergent from the ML. The above-described types of algorithm categories are not claimed as novel, but their particular application within this inventive technology is unique.

The separate AIE in the VME also automatically generates user-defined ledger reports on a user-defined reporting schedule. Reports can be automatically posted to the internet, messaging platforms, or social media accounts.

Algorithms generated from the AIS 150 can be used to steganographically hide the ledger from unauthorized Users 90 in images, auditory files, video, and computer code in public facing websites and portals, per User 90 requirements. If the ledger is posted on a publicly accessible website, ML can be used to hide the ledger from visual, auditory, or technological detection. Only those with the cipher and key will be able to detect and view the ledger. Steganography is not claimed as a novel invention, however the particular algorithms used in this inventive technology are unique for each implementation of the steganography.

Transaction input within the Workspace 132 may be completed via keyboard, auditory, automated computer processes or routines, or sensors. Any of the aforementioned input methods may also be used to launch the VME. The User 90's own computing environment (i.e., device, platform, and operating system) dictates the input methods available to the User 90.

Figure 2B:
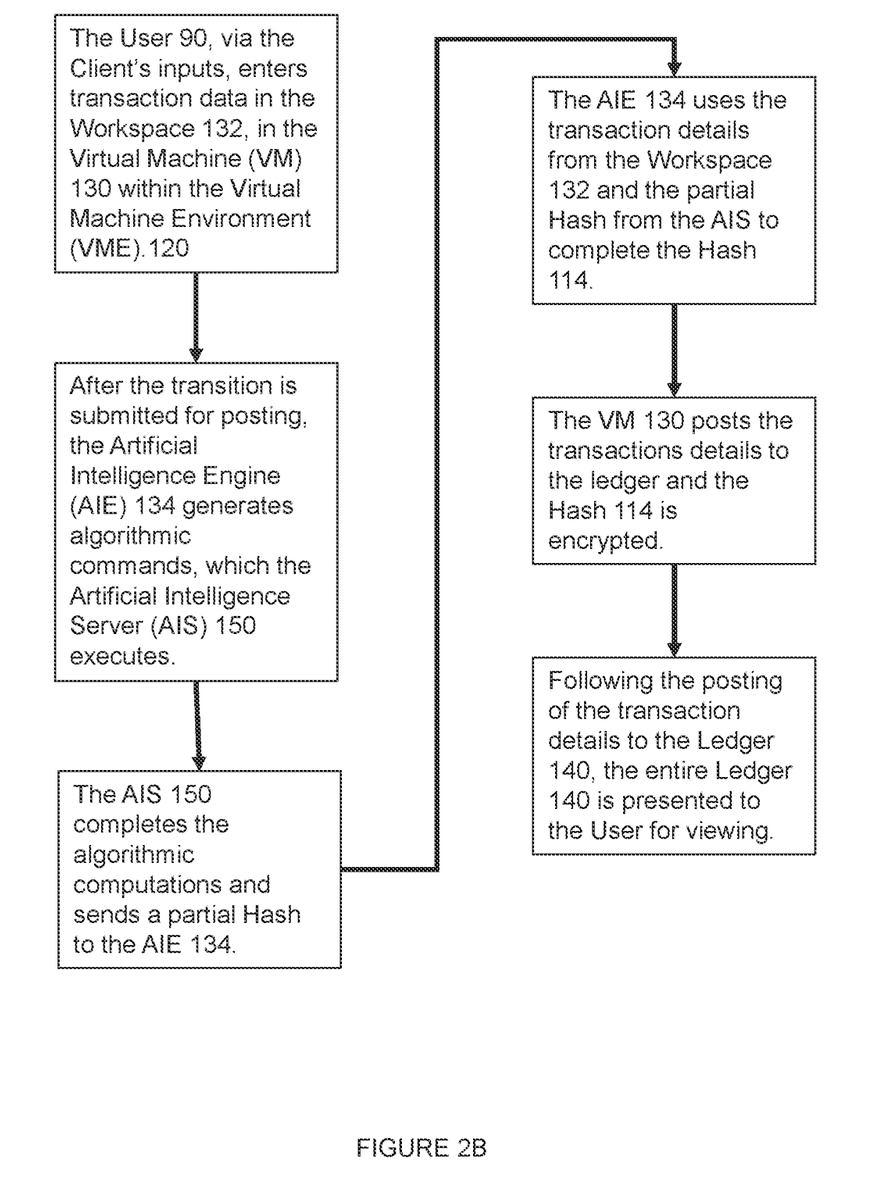
FIG. 2B is an example configuration of the steps for posting of a transaction to an embodiment of the Ledger Computing Environment 100 of the present invention as described herein.
Figure 3A:
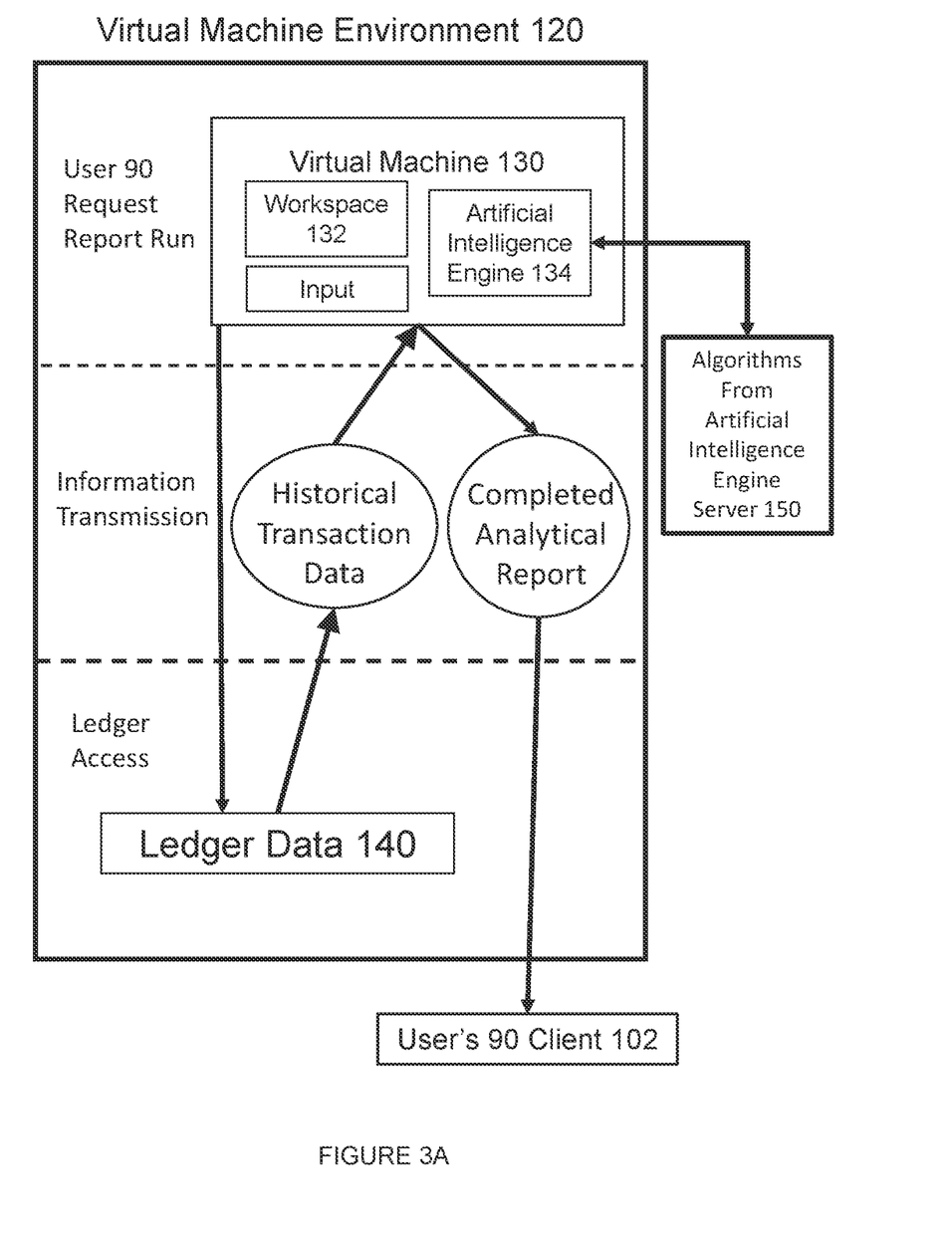
FIG. 3A is an example configuration which depicts the generation of a report or alert in the embodiment of the Ledger Computing Environment 100 of the present invention as described herein.
Figure 3B:
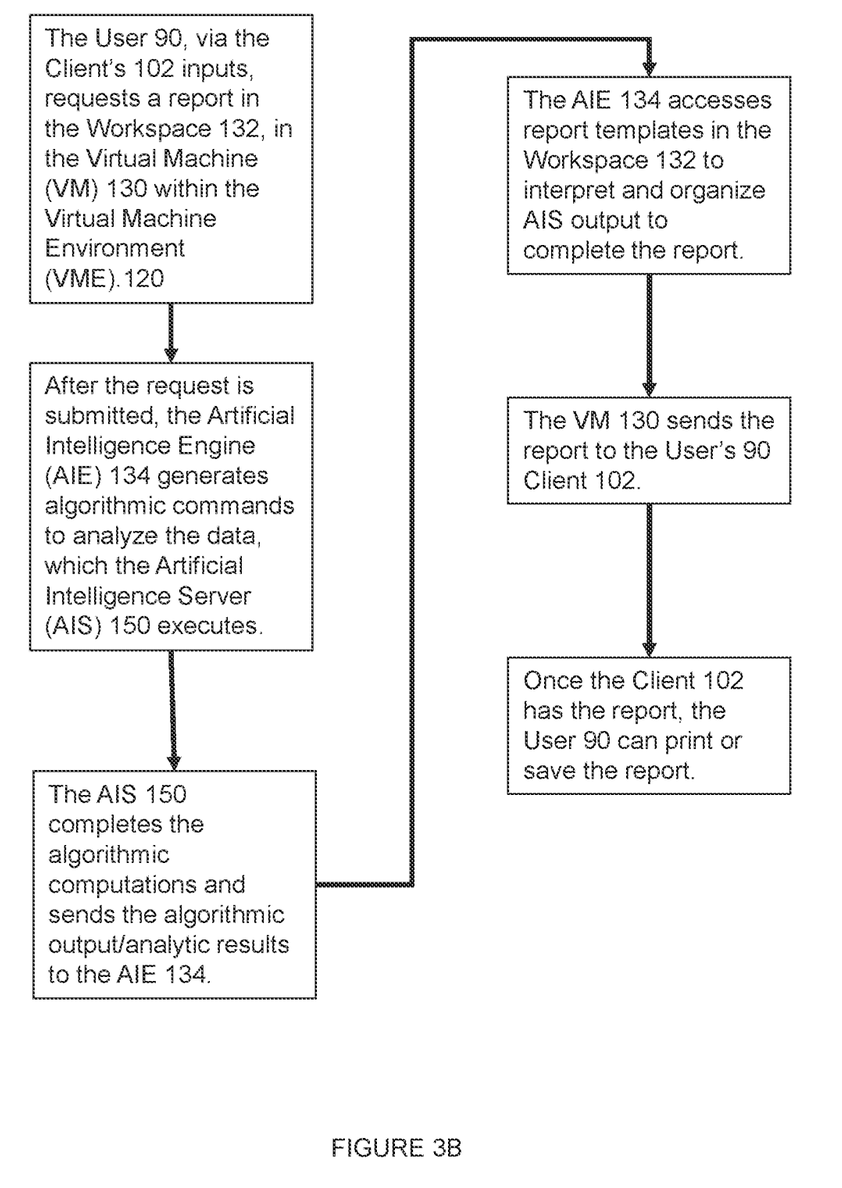
FIG. 3B is an example configuration of the steps for the generation of a report or alert in the embodiment of the Ledger Computing Environment 100 of the present invention as described herein.

FIG. 2B is an example configuration of the steps for posting of a transaction to an embodiment of the Ledger Computing Environment 100 of the present invention as described herein.

In a first step, the user 90, via the client 102's inputs, enters transaction data in the workspace 132, in the virtual machine 130 within the virtual machine environment 120;

In a second step, after the transition is submitted for posting, the artificial intelligence engine 134 generates algorithmic commands, which the artificial intelligence server 150 executes;

In a third step, the artificial intelligence server 150 completes the algorithmic computations and sends a partial hash 114 to the artificial intelligence engine 134;

In a fourth step, the artificial intelligence engine 134 uses the transaction details from the workspace 132 and the partial hash 114 from the artificial intelligence server 150 to complete the hash 114;

In a fifth step, the virtual machine 130 posts the transactions details to the ledger and the hash 114 is encrypted; and In a sixth step, following the posting of the transaction details to the ledger 140, the entire ledger 140 is presented to the user 90 for viewing.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. A method for use of an artificial intelligence-enhanced ledger computing environment for recording the outcomes of collective effort, the method comprising the following steps:

requesting connection to a virtual machine environment via a hypervisor operating system host by a client;

alerting by the host of a central server of the connection request;

requesting by the central server for a primary encryption key from a key management server;

contacting an artificial intelligence server by a key management server for algorithmic encryption processing;

completing a computation by the artificial intelligence server and completing a creation of a primary encryption key in the key management server;

sending the primary encryption key and a key identifier (ID) to the central server by the key management server;

storing a copy the key ID by the central server and passing the primary encryption key and the key ID to the host by the central server;

creating data encryption keys by the host;
passing along the data encryption keys from the host to the virtual machine environment;
entering transaction data in a workspace within a virtual machine within the virtual machine environment by a user via the client's inputs;
generating algorithmic commands within an artificial intelligence engine after the transaction is submitted for posting;
executing the algorithmic commands by the artificial intelligence server;
completing algorithmic computations in the artificial intelligence server and sending a partial hash to the artificial intelligence engine;
using transaction details from the workspace and the partial hash from the artificial intelligence server by the artificial intelligence engine to complete the hash;
posting the transactions details to the ledger by the virtual machine;
encrypting the hash; and
presenting the entire ledger to the user for viewing following the posting of the transaction details to the ledger.

2. An artificial intelligence-enhanced ledger computing environment system for recording the outcomes of collective effort, the ledger computing environment system comprising:
- a memory storing instructions to be executed by a processor;
- a hypervisor operating system host server for receiving a request for connection to a virtual machine environment, and input of transaction data, from one or more client computers, which upon receipt of a primary encryption key and a key identifier (ID), creates data encryption keys;
- a central server that receives alerts from the host, and upon receipt of the key ID and primary encryption key keeps the key ID and passes the primary encryption key and key ID to the host;
- a key management server that receives a request for the primary encryption key from the central server, and that sends the primary encryption key and key ID to the central server;
- an artificial intelligence server that, upon being contacted by the key management server, provides algorithmic encryption processing for creation of the primary encryption key within the key management server;
- a virtual machine environment containing a virtual machine module and ledger data, a virtual machine comprising a workspace configured in connection with the host, the virtual machine further comprising an artificial intelligence engine which integrates with the artificial intelligence server; and
- a stable ledger server which integrates with the ledger data within the virtual machine environment as well as with the artificial intelligence server, wherein upon requesting connection to the ledger computing environment and receiving the primary encryption keys and the data encryption keys, users submit for posting the transaction data to the workspace, the artificial intelligence engine generates algorithmic commands which the artificial intelligence server executes, the artificial intelligence server then completes the algorithmic computations and sends a partial hash to the artificial intelligence environment where transaction details from the workspace and the partial hash from the artificial intelligence server complete a hash, and wherein subsequently the virtual machine posts the transaction details to the ledger and the hash is encrypted and the entire ledger is then presented to a user for viewing.

* * * * *